United States Patent [19]

Wada et al.

[11] Patent Number: 4,611,473
[45] Date of Patent: Sep. 16, 1986

[54] REFRIGERATION SYSTEM WITH INTEGRAL CHECK VALVE

[75] Inventors: Fumio Wada; Koji Ishijima; Fumiaki Sano; Kazutomo Asami, all of Shizuoka, Japan

[73] Assignee: Mitsubishi Denki Kabushiki Kaisha, Tokyo, Japan

[21] Appl. No.: 765,091

[22] Filed: Aug. 13, 1985

[30] Foreign Application Priority Data

Aug. 17, 1984 [JP] Japan .................................. 59-171277

[51] Int. Cl.⁴ ............................................. F25B 43/00
[52] U.S. Cl. .................................. 62/503; 137/533.13
[58] Field of Search ...................... 62/503; 137/533.13

[56] References Cited

U.S. PATENT DOCUMENTS 3,167,930  2/1965  Block et al. ........................... 62/503
3,412,574  11/1968  Reiter .................................... 62/503
4,026,318  5/1977  Lejeune .......................... 137/533.31

Primary Examiner—Ronald C. Capossela
Attorney, Agent, or Firm—Sughrue, Mion, Zinn, Macpeak and Seas

[57] ABSTRACT

The number of potentially rupturable brazed refrigerant tubing connections in a refrigeration system is reduced by crimping the check valve 14a directly within a tubing section 14b prior to its bending and assembly, either upstream or downstream of the accumulator/separator 16.

6 Claims, 6 Drawing Figures

REFRIGERATION SYSTEM WITH INTEGRAL CHECK VALVE

BACKGROUND OF THE INVENTION

This invention relates to an improved refrigeration system embodying an integral coolant fluid check valve and having a reduced number of coolant fluid tubing connections.

An example of a conventional refrigeration system is shown in FIG. 1, and includes a vertically oriented rotary compressor 1 mounted in a closed shell 1a for supplying compressed gaseous refrigerant fluid to a condenser 10 through an output line 11. To complete the system the refrigerant fluid flows serially, in conventional manner, through an expansion device 9 such as a capillary tube or valve, an evaporator 8, an accumulator 6 for separating the liquid and gaseous components of the refrigerant fluid and retaining the former, and a vertically oriented check or non-return valve 4a schematically represented by an arrow. The check valve is flanked by individual pipe sections 4 either integral with or sealingly joined thereto, and the individual connections of the accumulator 6 and check valve 4a between the evaporator and the suction intake elbow 2 of the compressor are completed by tubing sections 3a, 3b and 3c as shown. The respective connections between the ends of such tubing sections and the suction intake elbow, check valve and accumulator are made by brazing to ensure fluid tightness.

There are thus a total of five such brazing connections at tubing joints a, b, c, d and e in a conventional installation, and each of this multiplicity of brazed joints represents a potential source of rupture and refrigerant fluid leakage due to fatigue cracks or the like attendant to operational vibrations after prolonged usage.

The installation of the check valve 4a downstream of the accumulator 6 as shown in FIG. 1 is preferred in systems having a large refrigerant capacity to minimize "reverse stream" vibrations and collision noise or "pipe rattle" during compressor start-up. The reversal of the respective check valve and accumulator dispositions is also conventional, however, in systems where the introduction of condensed liquid refrigerant and entrained lubricating oil into the compressor suction intake, and the attendant locking of the compressor during start-up, is a more dominant problem/consideration. In either alternative a total of five brazed tubing section joints is still involved.

SUMMARY OF THE INVENTION

This invention improves upon the conventional refrigeration systems described above by embodying the check valve directly within one of the connecting tubing sections using an insertion and crimping technique prior to the bending and brazing of the tubing section ends during final assembly. Such integral installation of the check valve reduces and minimizes the number of required brazing connections, and attendantly enhances the reliability of the system by reducing the number of potential sources of joint rupture and coolant fluid leakage.

DETAILED DESCRIPTION OF THE PREFERRED EMBODIMENTS

Figure 2:
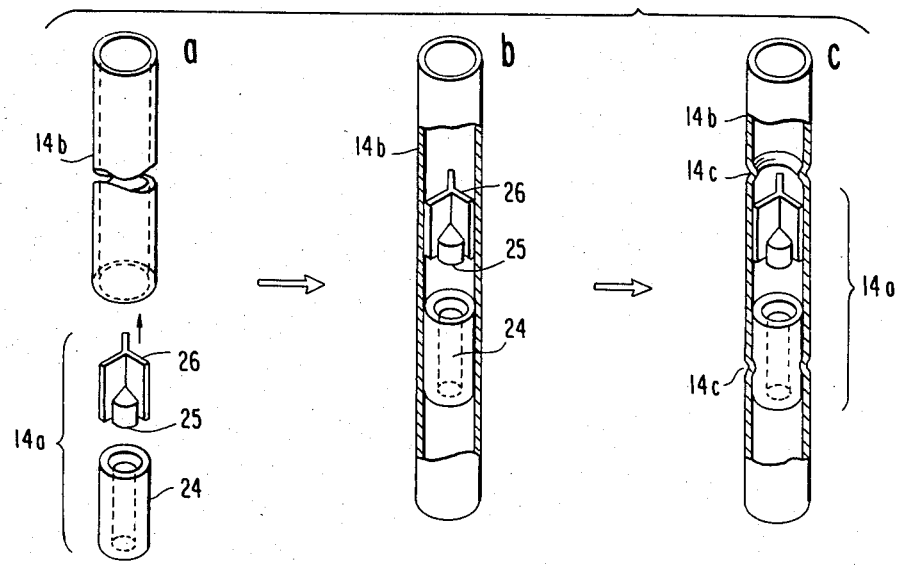

Referring to the assembly sequence shown in FIGS. 2(a) through (c), in accordance with the invention a check valve 14a including a centrally bored brass seat cylinder 24 having an inwardly tapering or countersunk upper face and a cooperating Teflon closure member 25 having radial guide vanes 26 is inserted into an unbent, elongate copper tubing section 14b from one end of the latter, and when appropriately positioned as in FIG. 2(b) it is sealingly fixed or locked in place by spaced circumferential crimpings 14c overlying the seat cylinder 24 and sufficiently above the closure member vanes to enable reliable operation as shown in FIG. 2(c). The sealing function is implemented by the compressive deformation of the lower crimping.

Figure 1:
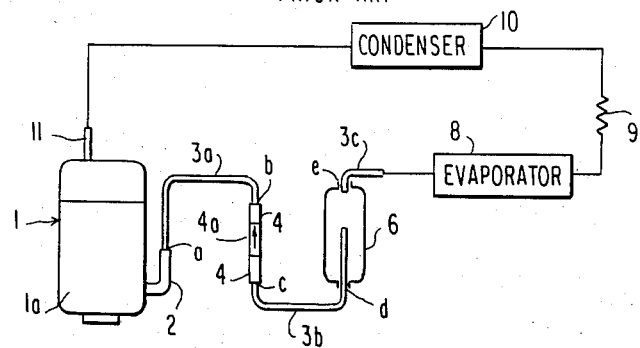
FIG. 1 is a schematic representation of a conventional refrigeration system, including a separately connected check valve, FIGS. 2(a), (b) and (c) show the sequential steps involved in installing a refrigeration system check valve in accordance with the invention.
Figure 3:
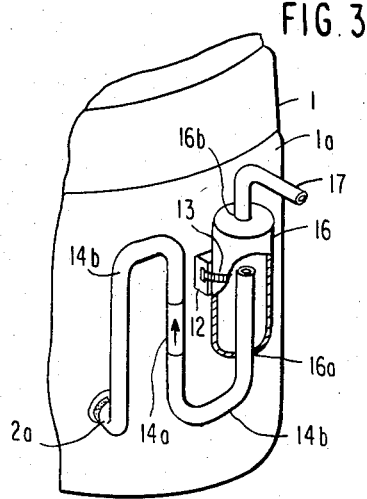
FIG. 3 is a partial perspective view of an accumulator and check valve operatively mounted on a compressor shell in accordance with a first embodiment of the invention.

In the first embodiment of the invention shown in FIG. 3, wherein the check valve is installed downstream of the accumulator, the tubing section 14b with the check valve 14a crimped in place therein is bent in a double U configuration as necessary and one end is brazed to the suction intake 2a of the compressor 1 while the other end is inserted into the lower end of the accumulator 16 and brazed thereto at 16a. A further tubing section 17 coming from the evaporator is coupled to an upper inlet of the accumulator 16 by brazing as at 16b, and the accumulator is secured to the compressor shell 1a by a mounting bracket 12 and encircling clamping ring 13 or the like. In addition to the obvious compactness and space saving attributes of such an arrangement or installation, it will be noted that only three brazing connections at 2a, 16a and 16b are now required as contrasted with five such connections as shown in the conventional arrangement of FIG. 1.

Figure 4:
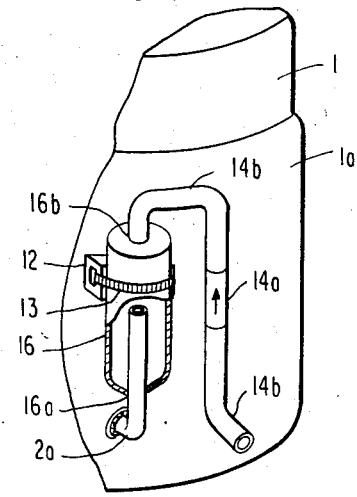
FIG. 4 is a similar perspective view in accordance with a second embodiment of the invention.

The second embodiment of the invention shown in FIG. 4 is generally similar to the first embodiment as illustrated in FIG. 3, again involving only three brazing connections at the suction intake 2a of the compressor and at the upper and lower couplings to the accumulator at points 16a and 16a, and differs therefrom primarily in the reversal of the accumulator and check valve positions to avoid the start-up locking of the compressor due to liquid refrigerant and lubricant ingestion.

Although the embodiments of FIGS. 3 and 4 are both illustrated in connection with vertically oriented rotary compressor units, the principles of the invention and the attendant benefits thereof in reducing the number of potentially rupturable brazing connections are equally applicable to horizontally oriented compressors, as will be obvious to those skilled in the art.

What is claimed is:

1. A refrigeration system including a check valve and an accumulator (16) connected together in series in a coolant fluid flow path at a suction inlet (2a) of a coolant fluid compressor (1), characterized by:

the check valve (14a) being inserted and sealingly mounted directly within a continuous and uninterrupted section of coolant fluid tubing (14b) to avoid potentially rupturable brazing connections between coolant fluid tubing sections and the check valve, wherein the check valve includes a stationary body member (24) sealingly fixed within said tubing section by a continuous circumferential crimp.

2. A refrigeration system according to claim 1, wherein the body member is a cylinder (24) and the closure member (25) has a plurality of radial, axially oriented vanes.

3. A refrigeration system according to claim 2, wherein the accumulator is mounted to a closed shell (1a) of the compressor by a mounting bracket (12) fixed to said shell and clamping means (13) anchoring the accumulator to the bracket.

4. A refrigeration system according to claim 2, wherein the check valve is disposed downstream of the accumulator in the fluid flow path.

5. A refrigeration system according to claim 2, wherein the check valve is disposed upstream of the accumulator in the fluid flow path.

6. A refrigeration system according to claim 1, wherein the body member defines a seat, the check valve further includes a movable closure member cooperable with the body member seat, and said tubing section is further circumferentially crimped a sufficient distance above the body member to allow operable axial movement of the closure member relative to the body member.

* * * * *